United States Patent
Engel et al.

Patent Number: 5,123,795
Date of Patent: Jun. 23, 1992

[54] QUARTER TURN FASTENER

[75] Inventors: Donald F. Engel, Prior Lake; Steven S. Gieseke, Richfield, both of Minn.

[73] Assignee: Donaldson Company, Inc., Minneapolis, Minn.

[21] Appl. No.: 575,558

[22] Filed: Aug. 29, 1990

[51] Int. Cl.⁵ ............................................ F16B 21/00
[52] U.S. Cl. ................................... 411/552; 411/553
[58] Field of Search .............. 411/349, 552, 553, 554, 411/549, 343

[56] References Cited

U.S. PATENT DOCUMENTS

| | | | |
|---|---|---|---|
| Re. 30,801 | 11/1981 | Gley . | |
| 2,765,697 | 10/1956 | Brush . | |
| 2,875,804 | 3/1959 | Flora . | |
| 3,114,405 | 12/1963 | Tait et al. | 411/349 |
| 3,152,822 | 10/1964 | Griffiths | 411/549 |
| 3,209,425 | 10/1965 | Barry et al. | 411/349 |
| 3,701,302 | 10/1972 | Pestka et al. . | |
| 3,736,834 | 6/1973 | MacDonald . | |
| 3,741,067 | 6/1973 | Moran . | |
| 3,752,032 | 8/1973 | Fiddler . | |
| 3,912,411 | 10/1975 | Moffat | 411/552 |
| 3,958,308 | 5/1976 | Gooding | 411/554 |
| 4,075,924 | 2/1978 | McSherry et al. . | |
| 4,145,862 | 3/1979 | Sygnator | 411/349 |
| 4,207,655 | 6/1980 | MacMaster . | |
| 4,728,238 | 3/1988 | Chisholm et al. . | |
| 4,801,232 | 1/1989 | Hempel | 411/552 |

FOREIGN PATENT DOCUMENTS

| | | |
|---|---|---|
| 239767 | 10/1987 | European Pat. Off. . |
| 2053387 | 4/1971 | France . |
| 2360776 | 3/1978 | France . |
| 2543628 | 10/1984 | France . |

OTHER PUBLICATIONS 3-page brochure, "New Fastener Facts", Rexnord, Inc., Specialty Fastener Division.

*Primary Examiner*—Neill R. Wilson
*Attorney, Agent, or Firm*—Merchant, Gould, Smith, Edell, Welter & Schmidt

[57] ABSTRACT

A quarter turn fastener (10) fastens a first component (12) to a second component (14). The fastener (10) has a cap (20) covering and rotating about a cylindrical mounting member (24) with a spring (34) therebetween. The mounting member (24) attaches to the first component (12) by barbs (28). Rotation is limited by a slot and tab arrangement having a tab (42) extending inward from the cap (20) into a slot (44) in the mounting member (24). The slot (44) extends one fourth of the way around the circumference of the mounting member (24) for limiting rotation and includes ridges (46, 48) preventing free rotation of the tab (42) at the ends of the slot (44). A shaft (36) attached to the cap (20) and extends through the mounting member (24), first component (12) and second component (14). A curved retainer member (38) engages slot (18) and has sloping engaging surfaces (52, 54, 56) for guiding the retainer member (38) into and out of the slot (18) when the fastener (10) is twisted.

16 Claims, 3 Drawing Sheets

5,123,795

QUARTER TURN FASTENER

BACKGROUND OF THE INVENTION

1. Field of the Invention

The present invention relates to spring-loaded fasteners for connecting a first component to a second component requiring only one quarter turn to switch between a fastening position and a release position.

2. Prior Art

Prior art fasteners which mount on a first component to connect the first component to a second component by rotating the fastener one quarter turn have not been totally satisfactory for a number of reasons. Quarter turn fasteners are used for a number of applications including fastening a lid to a canister or fastening adjacent panels.

Many fasteners have unrestricted rotation which makes alignment of the retaining members more difficult, since there are no stop points from which to reference position. Unrestricted rotation also makes it more difficult to determine whether or not a quarter turn fastener is in a fastened position. In addition to inadequate positioning, heretofore, quarter turn fasteners have offered no guidance in aligning the fastener or mechanical advantage to overcome the force of the spring in the fastener while fastening or releasing.

Without adequate mechanisms to retain fasteners in a fastened position, fasteners may be dislodged from the fastening position. Fasteners used with vibrating equipment often turn from the fastened position. As the machinery is operating, the fasteners are vibrated, causing them to rotate, possibly releasing.

Prior art quarter turn fasteners mounted on a first component have heretofore required additional attachment structure on the second component as well as the first component for fastening the members together. The structure extending from the second component is often undesirable for applications which require an unobstructed surface.

The prior art as represented by U.S. Pat. No. 4,207,655 to MacMaster, shows a self-aligning quarter-turn fastener. However, the fastener requires structure for connecting to a first piece and additional structure on a second piece to limit movement of the fastener and to attach to the pieces. The additional structure increases cost and does not leave an unobstructed surface on the second piece. The MacMaster fastener is rotationally restricted, but restricted only in such a manner that if the fastener is depressed, the fastener is free to rotate and may unlock and lose self-alignment.

U.S. Pat. No. 4,801,232 to Hempel, shows a quarter turn fastener which is not self-aligning and which does not restrict its rotation to 90 degrees when depressed. The fastener must fasten to a base having a T-groove with shoulders formed therein to lock.

It can be appreciated that a need exists for a quarter turn fastener that connects a first member to a second member having a flat surface, that is prevented from freely rotating in both the fastened and release positions, that is self-aligning and that provides mechanical assistance when fastening and when releasing. The present invention addresses these and other problems associated with quarter turn fasteners.

SUMMARY OF THE INVENTION

The present invention is directed to a quarter turn fastener for connecting two components.

The fastener has a cap portion with a handle extending therefrom covering a cylindrical mounting member. The mounting member has barbed connectors which clip to the first component through an orifice. The cap is biased up from the mounting member by a helical spring inside the cap and the mounting member. A shaft extends from inside the cap through the center of the mounting member and spring, the orifice of the first component, and an aligned slot in the second component. A retainer member at the end of the shaft engages the second component when in the fastened position to fasten the first and second components.

Rotation of the fastener is limited to a quarter turn by a slot and tab arrangement. A tab extends inward from the cap and engages a reduced radius slot portion of the mounting member extending one fourth of the way around the circumference of the mounting member. Ridges extend radially outward from near the ends of the slot to retain the tab at the ends of the slot in the release or fastened positions.

The retainer member engaging the second component has a curving engaging surface which has a changing slope to provide guidance into and out of the aligned slot while twisting between the fastened and release positions. The curving surface also provides mechanical advantage while twisting to overcome the force of the spring. The retainer member is configured to slip through the slot in the second component when in the release position.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

BRIEF DESCRIPTION OF THE DRAWINGS

In the accompanying drawings, in which like reference numerals and letters indicate corresponding elements throughout the several views.

DETAILED DESCRIPTION OF THE PREFERRED EMBODIMENT

Figure 1:
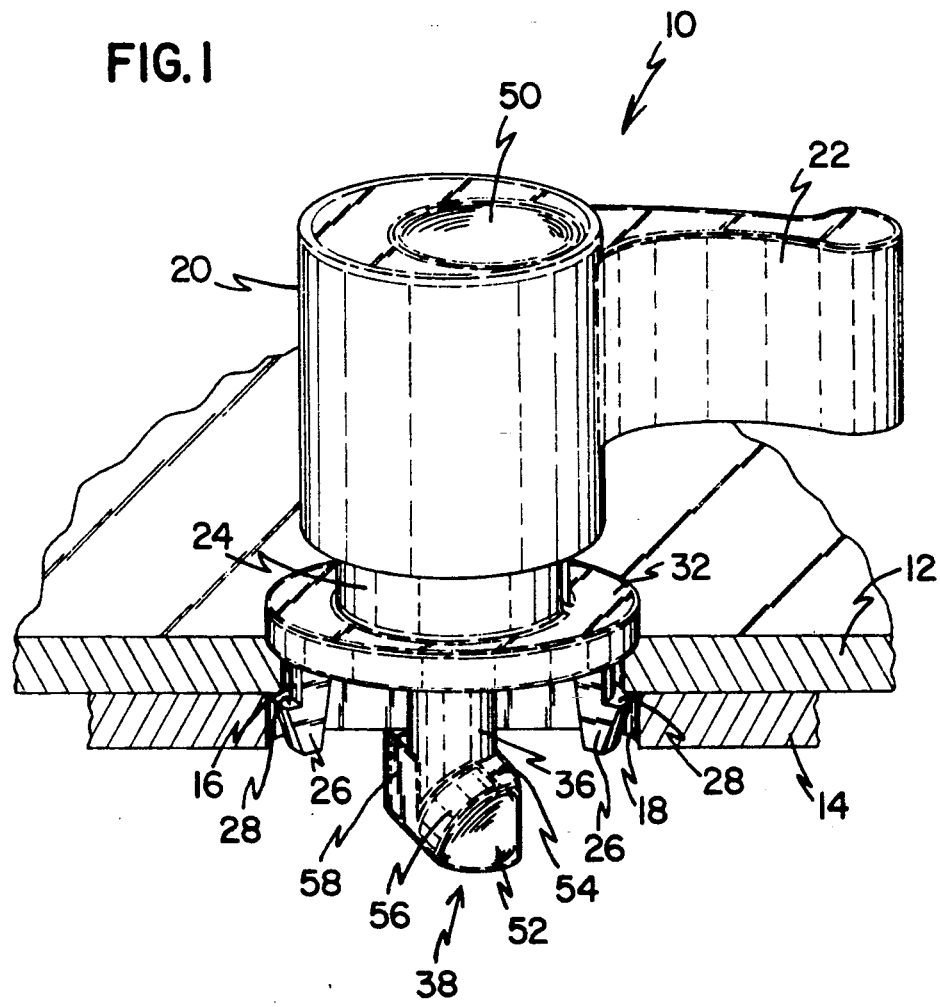
FIG. 1 shows a perspective view of a quarter-turn fastener according to the principles of the present invention with the connected panels in section.
Figure 2:
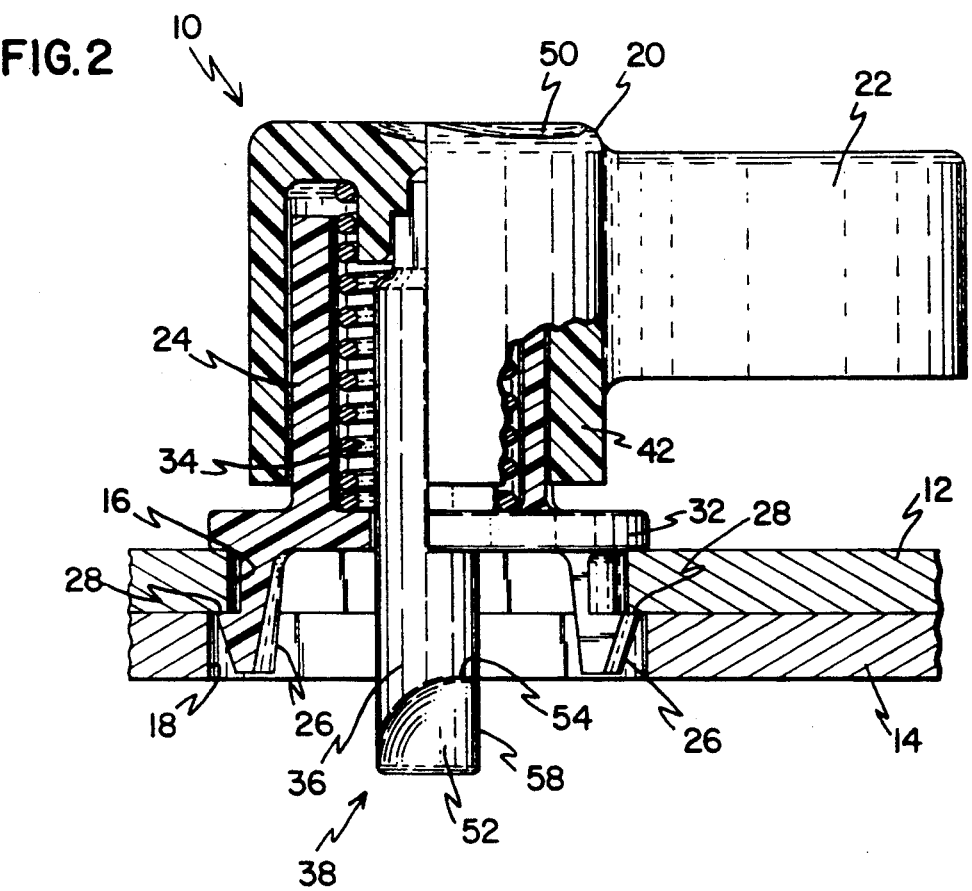
FIG. 2 is a side elevational and partial sectional view of the quarter-turn fastener of FIG. 1 in the fastened position.
Figure 3:
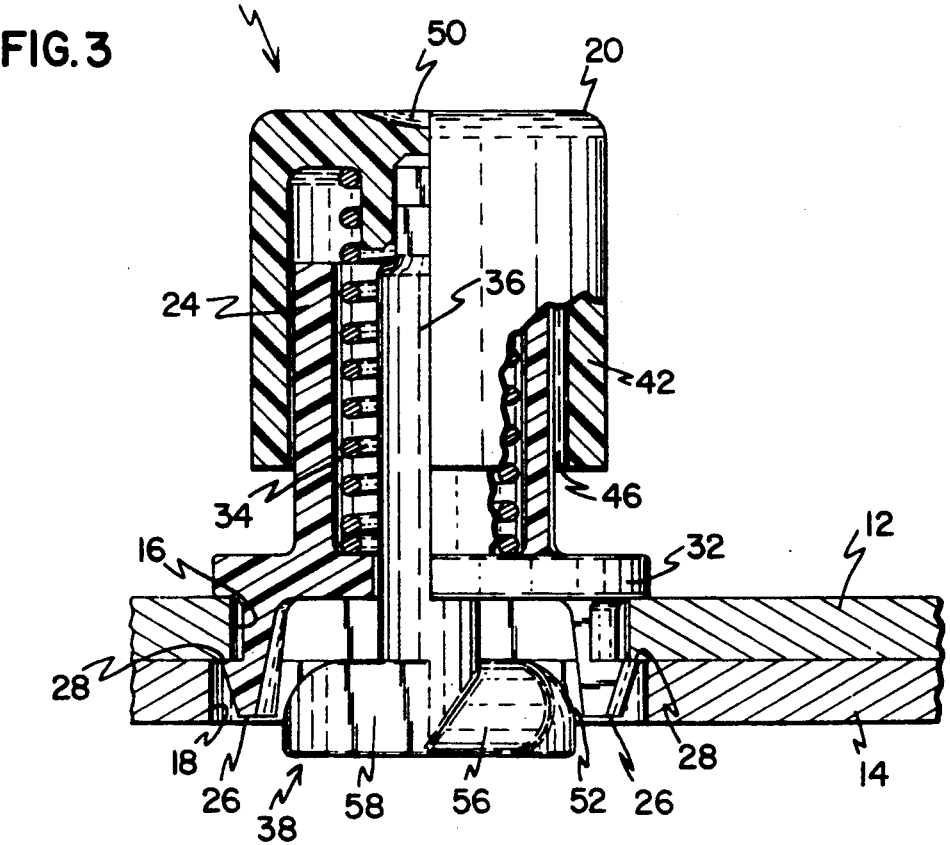
FIG. 3 is a side elevational and partial sectional view of the quarter-turn fastener of FIG. 1 in the release position.

Referring now to the Figures, and in particular to FIG. 1, a quarter turn fastener 10 is shown. The quarter turn fastener 10 connects a first component 12 to a second component 14 such as, for example, a lid to a flange of a canister. The fastener 10 has a cap 20 with a handle portion 22 extending therefrom. In the preferred embodiment, the handle portion 22 is curved to fit the shape of the thumb or hand and the top of the cap 20 has an indentation 50 to fit the curve of a thumb or fingers depressing the cap. The handle portion 22 eases twisting and provides a quick visual check to determine whether the fastener 10 is fastened. The cap 20 surrounds and covers a cylindrical mounting member 24 in the core of the cap. The cap 20 rotates and slides up and down within a limited range relative to the mounting member 24, as shown in FIGS. 2 and 3. A helical spring 34 inside the cylindrical mounting member 24 biases the cap 20 upward relative to the mounting member 24. The mounting member 24 has a base portion 32 which fits proximate the first component 12 and attaches through opening 16 to the first component 12 with mounting clips 26 having barbs 28 engaging the underside of the first component 12.

Figure 4:
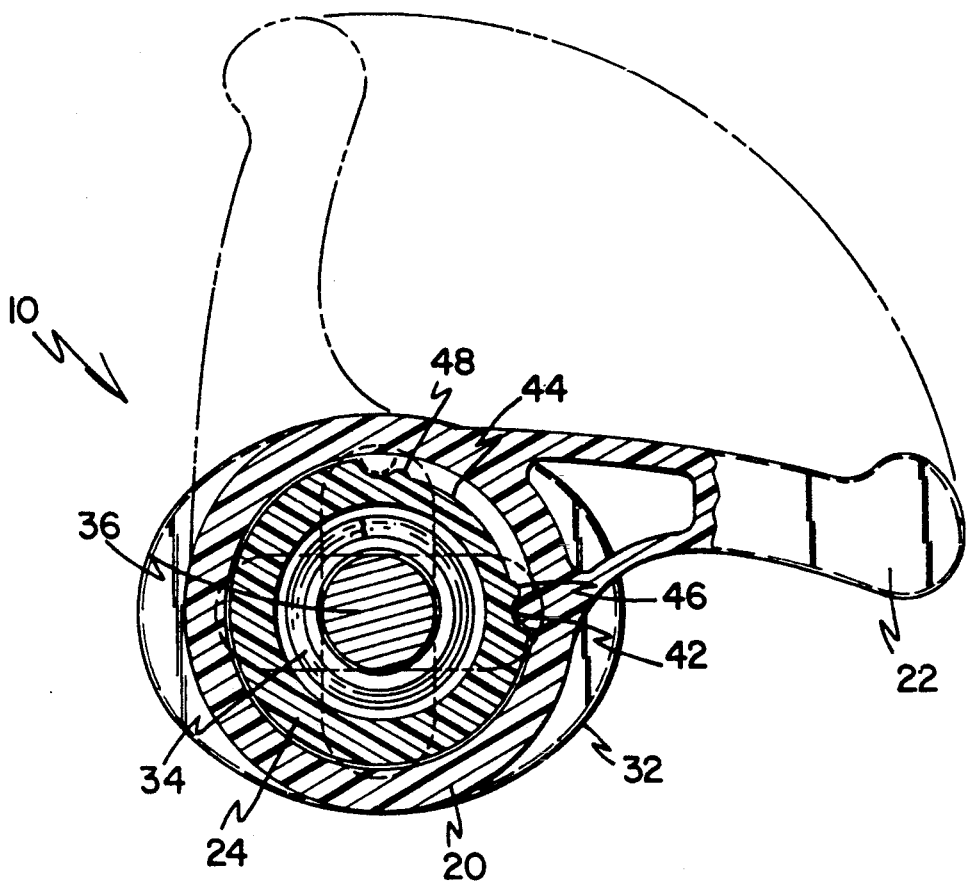
FIG. 4 is a top plan view of the quarter-turn fastener of FIG. 1 in the fastened position; and, FIG. 5 is a perspective view of the shaft and retainer member of the quarter-turn fastener shown in FIG. 1.
Figure 5:
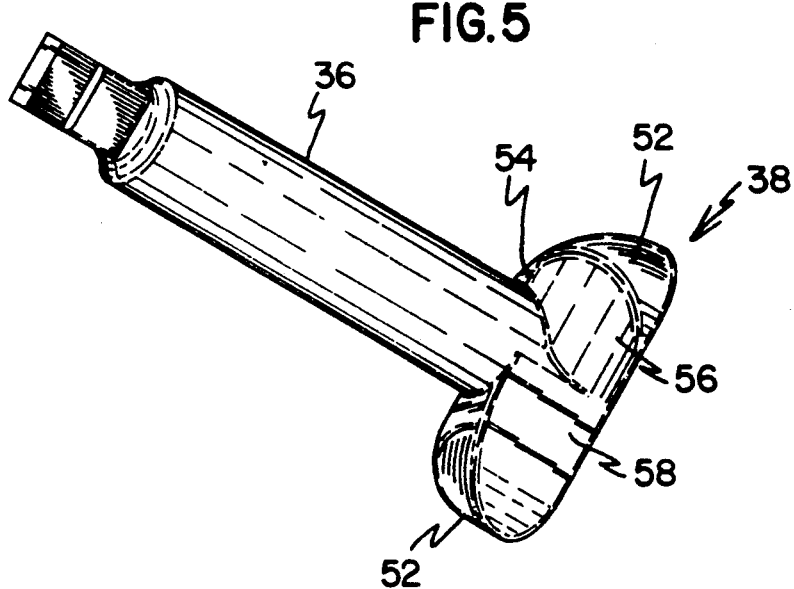

As shown in FIGS. 2-4, the rotation of the cap 20 relative to the mounting member 24 is limited by tab 42 extending inward from the cap 20 into slot 44 in the mounting member 24. The slot 44 is a reduced outer radius portion of the mounting member 24 extending along one fourth of the circumference of the mounting member 24 to limit movement of the tab 42 within that range. Retainer ridges 46 and 48 extend slightly radially outward from the slot 44 to hold the tab 42 at the respective ends of the slot 44 so that the fastener 10 does not freely rotate out of the fastened or released positions. It can be appreciated that the ridges 46 and 48 extending vertically along the mounting member 24 prevent free rotation even if the cap 20 is depressed.

Shaft 36 connects at a first end to cap 20, as shown in FIGS. 2 and 3. The shaft 36 extends from the cap 20 through the center of the mounting member 24 and the spring 34. The second end of the shaft 36 projects through orifice 16 in the first component 12 and slot 18 in the second component 14 and has a cross piece which functions as a retainer member 38.

The retainer member 38 has an outline similar to that of the slot 18 in the second component 14 so that the retainer member 38 fits through the slot 18 in the release position. The retainer member 38 is pulled up into the slot 18 by the force of the spring 34 pushing the cap 20 and shaft 36 upward when the fastener is in the release position, as shown in FIG. 3. When rotated a quarter turn, the retainer member 38 extends across the slot 18 so that the retainer member 38 retains the second component 14 against the first component 12, as shown in FIG. 2.

The ends of the retainer member 38 are formed in a changing curve, as shown in FIGS. 1, 2, 3 and 5. The changing slope across the retainer member 38 has a smaller radius curve portion 52 around each retainer end, a larger radius curving portion 56 along a first side of each end which follows along a portion of the shaft 36, and a nearly flat portion 54 along the top of the retainer member proximate the second side 58 of each end. The curve portions merge into one another to guide the retainer member 38 into and out of the slot 18 while twisting the fastener 10 between the fastened and release positions. The changing curve also provides mechanical advantage as the retainer member 38 engages the slot 18 when the fastener 10 is twisted from the release to the fastened position to overcome the force of the spring 34 pulling upward.

As the fastener 10 is twisted, the curving portions 52 and 56 on each end of the retainer member 38 engage the edges of the slot 18. As the retainer member 38 is turned toward the fastened position, the engaging surface portions 52 and 56 pull the shaft 36 down. The curved portions 56 engaging the second component 14 provide guidance and reduce the force required to twist. As the contact point with the retainer member 38 approaches the nearly flat portion 54 and the retainer member 38 is nearly out of the slot 18, the relative movement between the retainer member 38 and the second component 14 is substantially horizontal rather than vertical so that the force required to overcome the spring 34 is reduced. The flatter slope of portion 54 at the upper portions of the retainer member 38 provides increasing guidance when decreased mechanical advantage is required. When the retainer member 38 is moved out of the slot 18 and engages only the surface of the second component 14, the relative movement is entirely horizontal so that no further mechanical advantage or guidance is required.

It can be appreciated that the shape of the slot 18 and the retainer member 38 can be changed provided that the retainer member can pass through the slot in the release position and retain the second component 14 in the fastened position by turning the fastener 10 one quarter turn and the engaging surface meets the second panel to provide guidance and mechanical advantage when turning the fastener.

In use, the components 12 and 14 are placed proximate one another so that the orifice 16 and the slot 18 are aligned. The cross piece of the retainer member 38 is aligned so as to fit through the slot 18 as shown in FIG. 3 so that the tab 42 is in the release position, retained by the ridge 48, as shown in FIG. 4 in phantom. The cap 20 is pressed down so that the shaft 36 and retainer member 38 extend further through slot 18. The fastener 10 is rotated one quarter turn so that the tab 42 is moved past the ridge 48, through slot 44, past ridge 46 to the fastened position as shown in FIGS. 1, 2 and 4. As the cap 20 and shaft 36 are rotated, the retainer member 38 engages the second panel 14 at the edge of the slot 18. As the fastener 10 is turned further, the curved surfaces 52 and 56 of the retainer member 38 continue to push the retainer member 38 out of the slot 18 to engage the face of the second panel 14. When the fastener 10 is turned wholly through the quarter turn, the tab 42 moves past ridge 46 to the end of the slot 44 and the retainer member 38 is rotated so that it is transverse to the length of the slot 18, thereby retaining the members 12 and 14, as shown in FIG. 2.

To release the fastener 10, the cap 20 is depressed and twisted so that the retainer member 38 is guided into the slot 18. The cap 20 may also be depressed and held in a depressed position while twisting until the retainer member 38 is aligned with the slot 18. When the retainer member 38 is aligned with the slot 18, the cap 20 is released from the depressed position so that the retainer member 38 is lifted by the spring 34 into the slot 18, as shown in FIG. 3. At the same time, twisting of the fastener 10 moves the tab 42 past ridges 46 and 48 to the release end of the slot 44. When the retainer member 38 is aligned with the slot 18, the second component 14 is no longer retained and may be separated from the first component 12.

Even though numerous characteristics and advantages of the present invention have been set forth in the foregoing description, together with details of the structure and function of the invention, it is to be understood that the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. An apparatus for removably fastening a first component onto a second component, the first component having an orifice and the second component having a slot extending therethrough, the apparatus comprising:
   a) a cap portion;
   b) a core portion extending into the cap portion and rotatably and slidably connecting to the cap portion;
   c) rotation limiting means for restricting rotation of the cap relative to the core within a predetermined angle of rotation;
   d) biasing means engaging the cap portion and the core portion for biasing the core portion away from the cap portion;
   e) a shaft portion attaching to the cap portion and extending from the core portion and through the orifice of the first component and the slot of the second component;
   f) self-contained attachment means for connecting the apparatus to the first component through an orifice in the first component; and,
   g) a retaining member attached to the end of the shaft portion having a changing sloping surface engaging the second component and the slot.

2. An apparatus according to claim 1, wherein the core portion is substantially cylindrical and wherein the rotation limiting means comprises a tab member extending from the cap toward the core portion and wherein the core portion has a smaller radius section around a portion of the core, allowing the tab member to rotate with the cap around the core portion within the range defined by the smaller radius section.

3. An apparatus according to claim 2, wherein the rotation limiting means further comprises ridges at each end of the smaller radius portion to retain the tab member so the fastener is retained in the fastened or release position.

4. An apparatus according to claim 1, wherein the retaining member comprises a member having a substantially greater length than width.

5. An apparatus according to claim 4, wherein the retaining member has curved end portions curving at a varying slope to provide guidance while locking and releasing the fastener apparatus.

6. An apparatus according to claim 1, further comprising handle means extending from the cap portion.

7. An apparatus according to claim 1, wherein the biasing means comprises a helical spring surrounding the shaft portion.

8. An apparatus according to claim 1, wherein the attachment means comprise barbed members engaging the first component at the edge of the orifice.

9. An apparatus according to claim 1, wherein the cap portion further comprises handle means.

10. A fastener apparatus for connecting a first element to a base element, the base element having a slot extending therethrough, the fastener apparatus comprising:
    a) a cylindrical core member;
    b) a cap element covering the core member and rotatably and slidably connecting to the core member;
    c) biasing means inside the core member and engaging the cap, wherein the biasing means pushes the cap away from the core;
    d) a shaft extending from the cap member and through the core member, panel and base;
    e) a base engaging member attached at the end of the shaft, wherein the base engaging member is configured to pass through the slot in a release position and wherein the base engaging member engages the base and retains the first element proximate the base in a locked position, and wherein the base engaging member has a curving surface engaging the slot configured to provide lift and guidance upon engaging the slot while twisting from the release to the fastened position and to aid in turning the fastener and overcoming the force of the biasing means.

11. A fastener apparatus attaching to a first member for retaining the first member proximate a base member, the first member and the base member each having an orifice extending therethrough, comprising:
    a) a cylinder portion, including a reduced radius section along a portion of the circumference of the cylinder portion;
    b) a cap portion extending around and over one end of the cylinder portion and having a tab portion extending radially inward and aligned in the reduced radius section, the cap portion slidably and rotatably connected to the cylinder portion within a range limited by the rotation of the tab in the reduced radius section;
    c) a shaft portion extending from the cylinder portion away from the cap portion through the orifice in the first member and the base member;
    d) a retaining member at the end of the shaft portion configured to release the base portion when the fastener is in the release position and engaging the base when the fastener is in the fastened position.

12. A fastening apparatus for connecting a first member to a second member, the first member and the second member each having an orifice extending therethrough, comprising a fastener portion including attachment means for attaching the fastener portion to the first member; a shaft portion and a retainer portion for engaging the second member; rotation limiting means for limiting rotation of the fastener portion within a limited range between a fully fastened and a fully released position; and rotation restricting means for preventing free rotation of the fastener portion at each end of the limited range of rotation.

13. An apparatus for removably fastening a first component onto a second component, the first component having an orifice and the second component having a slot extending therethrough, the apparatus comprising:
    a) a cap portion;
    b) a core portion extending into the cap portion and rotatably and slidably connecting to the cap portion;
    c) rotation limiting means for restricting rotation of the cap relative to the core within a predetermined angle of rotation; wherein the core portion is substantially cylindrical and wherein the rotation limiting means comprises a tab member extending from the cap toward the core portion and wherein the core portion has a smaller radius section around a portion of the core, allowing the tab member to rotate with the cap around the core portion within the range defined by the smaller radius section;

d) biasing means engaging the cap portion and the core portion for biasing the core portion away from the cap portion;

e) a shaft portion attaching to the cap portion and extending from the core portion and through the orifice of the first component and the slot of the second component;

f) attachment means for connecting the apparatus to the first component; and, g) a retaining member attached to the end of the shaft portion having a changing sloping surface engaging the second component and the slot.

14. An apparatus according to claim 13, wherein the rotation limiting means further comprises ridges at each end of the smaller radius portion to retain the tab member so the fastener is retained in the fastened or release position.

15. A fastening apparatus for connecting a first member to a second member, the first member and the second member each having an orifice extending therethrough comprising a fastener portion including attachment means for attaching the fastener portion to the first member; a shaft portion and a retainer portion for engaging the second member; and rotation restricting means for preventing the fastener portion from freely rotating from a first position wherein the fastening apparatus is locked and from freely rotating from a second position wherein the fastening apparatus is unlocked.

16. A fastener apparatus for connecting a first element to a base element, the base element having a slot extending therethrough, the fastener apparatus comprising:

a) a cylindrical core member;

b) a cap element covering the core member and rotatably and slidably connecting to the core member;

c) biasing means inside the core member and engaging the cap, wherein the biasing means pushes the cap away from the core;

d) a shaft extending from the cap member and through the core member, panel and base;

e) a base engaging member attached at the end of the shaft, wherein the base engaging member is configured to pass through the slot in a release position and wherein the base engaging member engages the base and retains the first element proximate the base in a locked position; wherein the base engaging member further comprises a sloping base engaging surface configured to align and guide base engaging member relative to the slot for releasing and locking the fastener apparatus, and wherein the base engaging member has curved end portions, the end portions having a continuously changing curvature so that the base engaging member aids in turning the fastener and overcoming the force of the biasing means, and wherein the changing curve flattens across the end portions of the member so that the base engaging member provides more lift and guidance upon initially engaging the slot while twisting from the release to fastened position.

* * * * *